United States Patent
Ho

(10) Patent No.: US 12,461,329 B2
(45) Date of Patent: Nov. 4, 2025

(54) FIXING ASSEMBLY FOR LENS AND LENS HOLDER AND ELECTRONIC DEVICE

(71) Applicant: TRIPLE WIN TECHNOLOGY(SHENZHEN) CO.LTD., Shenzhen (CN)

(72) Inventor: Hung-Lung Ho, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 534 days.

(21) Appl. No.: 18/071,432

(22) Filed: Nov. 29, 2022

(65) Prior Publication Data
US 2024/0142741 A1  May 2, 2024

(30) Foreign Application Priority Data
Nov. 1, 2022 (CN) .......................... 202211358187.3

(51) Int. Cl.
*G02B 7/02* (2021.01)
*G02B 5/00* (2006.01)

(52) U.S. Cl.
CPC ............. *G02B 7/021* (2013.01); *G02B 7/026* (2013.01); *G02B 5/005* (2013.01)

(58) Field of Classification Search
CPC ...................................................... G02B 7/02
USPC ....... 359/819, 821, 822, 823, 824, 825, 826, 359/827, 828, 829, 830
See application file for complete search history.

(56) References Cited

U.S. PATENT DOCUMENTS

| | | | | |
|---|---|---|---|---|
| 3,783,191 A | * | 1/1974 | Sugimoto | G02B 7/02 348/374 |
| 5,986,823 A | * | 11/1999 | Yang, Jr. | G02B 7/021 359/742 |
| 7,072,125 B2 | * | 7/2006 | Chuman | G02B 7/021 359/821 |
| 7,168,161 B2 | | 1/2007 | Hanada | |
| 8,437,095 B2 | * | 5/2013 | Lin | G02B 7/04 359/811 |
| 2021/0136260 A1 | * | 5/2021 | Pan | G03B 17/02 |
| 2022/0019131 A1 | * | 1/2022 | Moehrle | H04N 23/55 |
| 2022/0035118 A1 | * | 2/2022 | Hu | G03B 30/00 |
| 2022/0163750 A1 | * | 5/2022 | Hu | G02B 7/021 |
| 2023/0050899 A1 | * | 2/2023 | Song | G02B 13/0015 |

(Continued)

FOREIGN PATENT DOCUMENTS

| | | |
|---|---|---|
| CN | 101571617 A | 11/2009 |
| CN | 208432778 U | 1/2019 |
| JP | 2004282142 A | 10/2004 |

*Primary Examiner* — Bumsuk Won
*Assistant Examiner* — Seth D Moser
(74) *Attorney, Agent, or Firm* — ScienBiziP, P.C.

(57) ABSTRACT

A fixing assembly of reduced size, with a light-passing aperture for a lens holder and lens, includes a sidewall and an extending portion, the first sidewall is a ring-shaped structure, the extending portion is disposed on inner wall of the first sidewall, and the extending portion extends from an inner surface of the first sidewall. A top surface of the extending portion is recessed relative to a top surface of the first sidewall to form a groove. The lens is received in the groove and connected to the extending portion. The light-passing aperture is disposed on a surface of the lens away from the at least one extending portion, and the aperture is clamped with the lens holder.

4 Claims, 11 Drawing Sheets

(56) References Cited

U.S. PATENT DOCUMENTS

| | | | |
|---|---|---|---|
| 2023/0236386 A1* | 7/2023 | Cheng | G02B 7/09 |
| | | | 359/824 |
| 2023/0314752 A1* | 10/2023 | Hwang | H04N 23/55 |
| 2023/0314902 A1* | 10/2023 | Xu | G03B 5/00 |
| | | | 359/819 |
| 2024/0126139 A1* | 4/2024 | Shin | G03B 3/10 |
| 2024/0210650 A1* | 6/2024 | Jeon | G02B 7/021 |
| 2025/0028140 A1* | 1/2025 | Liu | G02B 7/028 |

* cited by examiner

FIXING ASSEMBLY FOR LENS AND LENS HOLDER AND ELECTRONIC DEVICE

FIELD

The subject matter herein generally relates to optical devices, and more particularly, to a fixing assembly and an electronic device.

BACKGROUND

Electronic devices, such as digital cameras and video cameras, are required to be thinner and lighter. The electronic device may have a lens module. The size of the lens module is relatively large, which is not conducive to the miniaturization of the electronic device. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
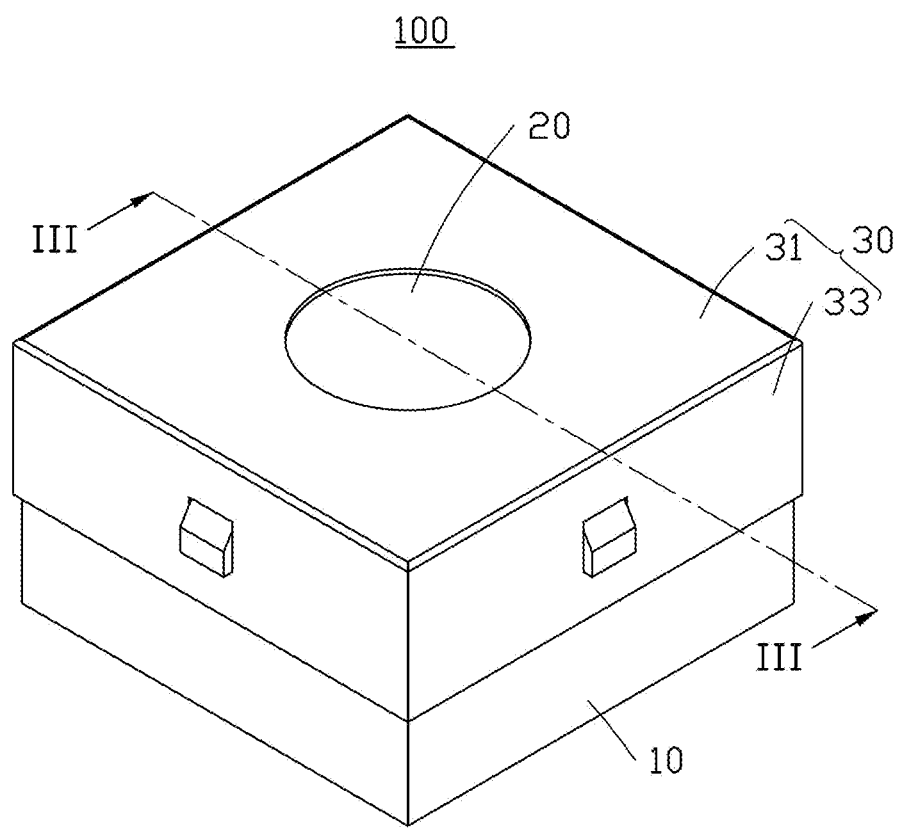
FIG. 1 is a diagrammatic view of an embodiment of a fixing assembly according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
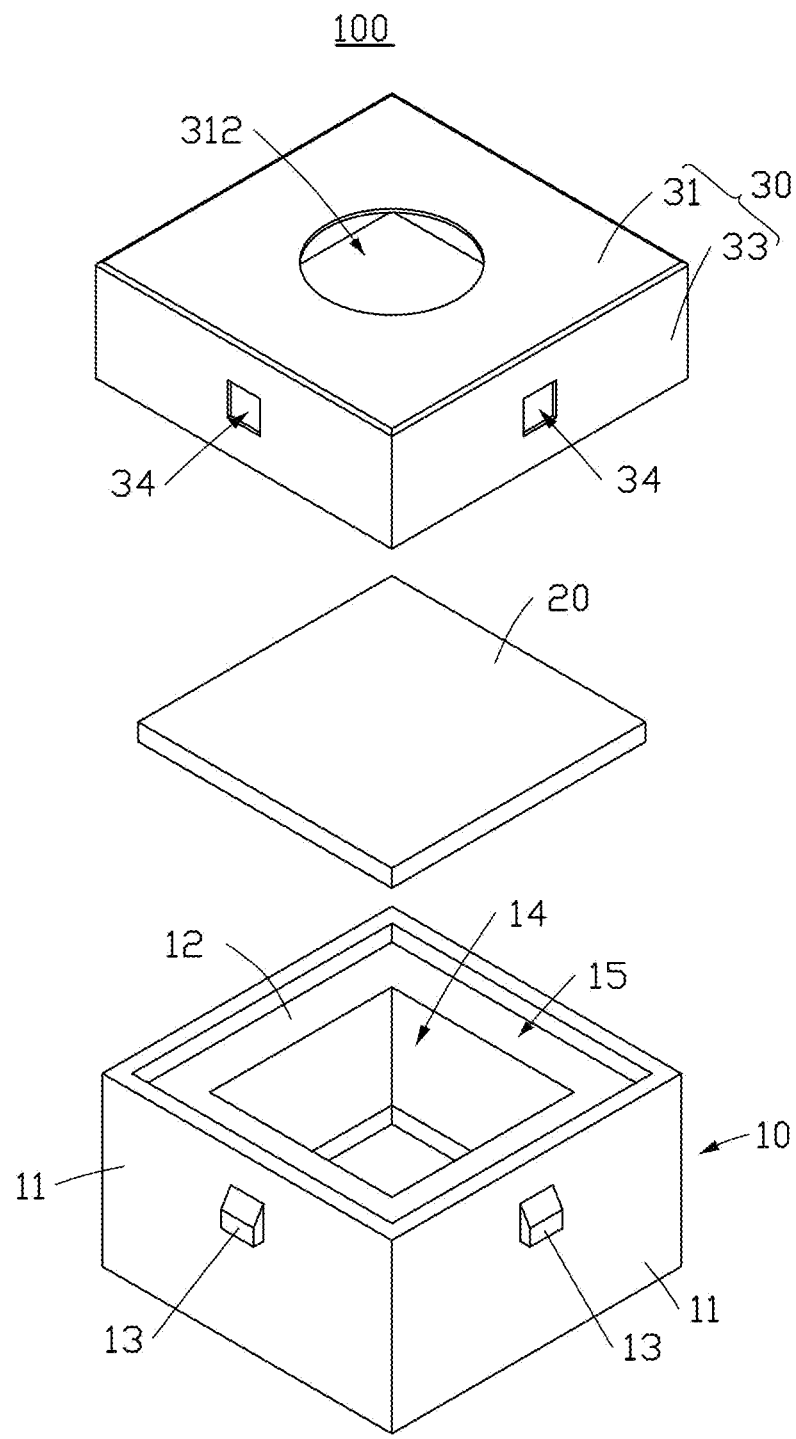
FIG. 2 is an exploded view of the fixing assembly of FIG. 1.
Figure 3:
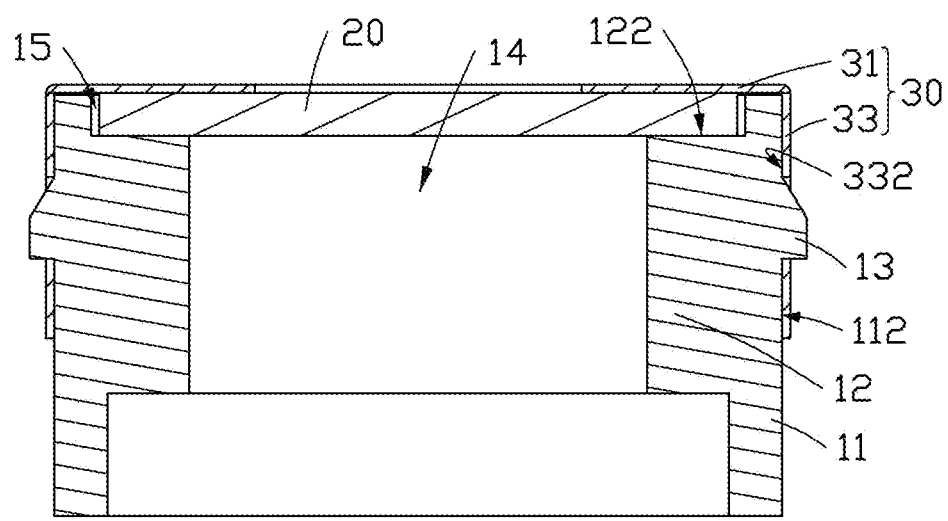
FIG. 3 is a cross-sectional view taken along line of FIG. 1.

Referring to FIGS. 1, 2 and 3, a fixing assembly 100 that can be used as a lens module is provided according to an embodiment of the present disclosure. The fixing assembly 100 includes a lens holder 10, at least one lens 20, and an aperture 30. The lens 20 is disposed between the lens holder 10 and the aperture 30. The aperture 30 is detachably fixed to the lens holder 10, so that the lens holder 10, the lens 20, and the aperture 30 are assembled as a whole.

In the embodiment, the lens holder 10 is substantially a cuboid structure with a hollow interior space. The lens holder 10 includes four first sidewalls 11. Two adjacent first sidewalls 11 are connected to each other. The four first sidewalls 11 form the cuboid structure.

The lens holder 10 further includes four extending portions 12 extending from inner surfaces of the first sidewalls 11. In the embodiment, each extending portion 12 extends from the inner surface of one of the first sidewalls 11. Two adjacent extending portions 12 are connected to each other. Four extending portions 12 form a ring-shaped structure. That is, the lens holder 10 includes a through hole 14, and the extending portions 12 surround the through hole 14.

The top surface (that is, the surface 122) of the extending portion 12 is recessed relative to a top surface of the first sidewall 11 (that is, the surface 111), so a groove 15 is formed between the first sidewall 11 and the extending portion 12. The groove 15 communicates with the through hole 14. The lens 20 is accommodated in the groove 15. The lens 20 is in contact with the surface 122 of the extending portion 12. Ambient light can pass through the through hole 14 to fall on a light-sensitive chip.

In other embodiments, the number of the extending portions 12 is not limited to four, and may be changed according to need.

The aperture 30 can be a metal sheet or a plastic sheet.

In some embodiments, the aperture 30 includes an aperture sheet 31 and four second sidewalls 33, and the four second sidewalls 33 surround a periphery of the aperture sheet 31. The aperture sheet 31 is disposed on a surface of the lens 20 away from the extending portions 12. The aperture sheet 31 is connected to the surface of the lens 20 away from the extending portions 12. A space formed by the four second sidewalls 33 matches an outer surface 112 of the first sidewalls 11, and the outer surface 112 of the first sidewall 11 is in contact with an inner surface 332 of the second sidewall 33. That is, the aperture 30 is wrapped on the lens holder 10. A light-passing hole 312 is defined on the aperture sheet 31. The ambient light passes through the light-passing hole 312, and then passes through the lens 20 and enters the through hole 14.

The first sidewall 11 includes a clamping portion 13. The second sidewall 33 includes a slot 34. The clamping portion 13 is clamped in the slot 34, so that the aperture 30 is fixedly connected to the lens holder 10, and the lens 20 can be fixed between the aperture sheet 31 and the extending portion 12.

In the embodiment, the slot 34 is a through hole penetrating through two opposite surfaces of the second sidewall 33. In other embodiments, the slot 34 can be a blind hole defined on the inner surface 332 of the second sidewall 33.

Figure 4:
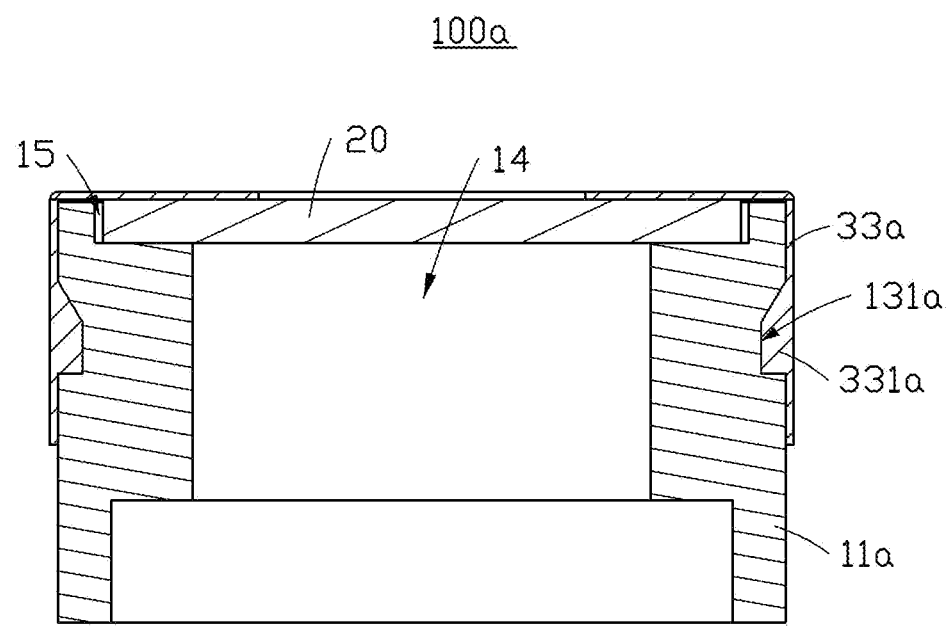
FIG. 4 is a diagrammatic view of another embodiment of a fixing assembly according to the present disclosure.

Referring to FIG. 4, a fixing assembly 100a is provided according to another embodiment of the present disclosure. Different from the fixing assembly 100, a clamping portion 331a is disposed on the second sidewall 33a, and the holding groove 131a is disposed on the first sidewall 11a. The clamping portion 331a is held in the holding groove 131a.

Figure 5:
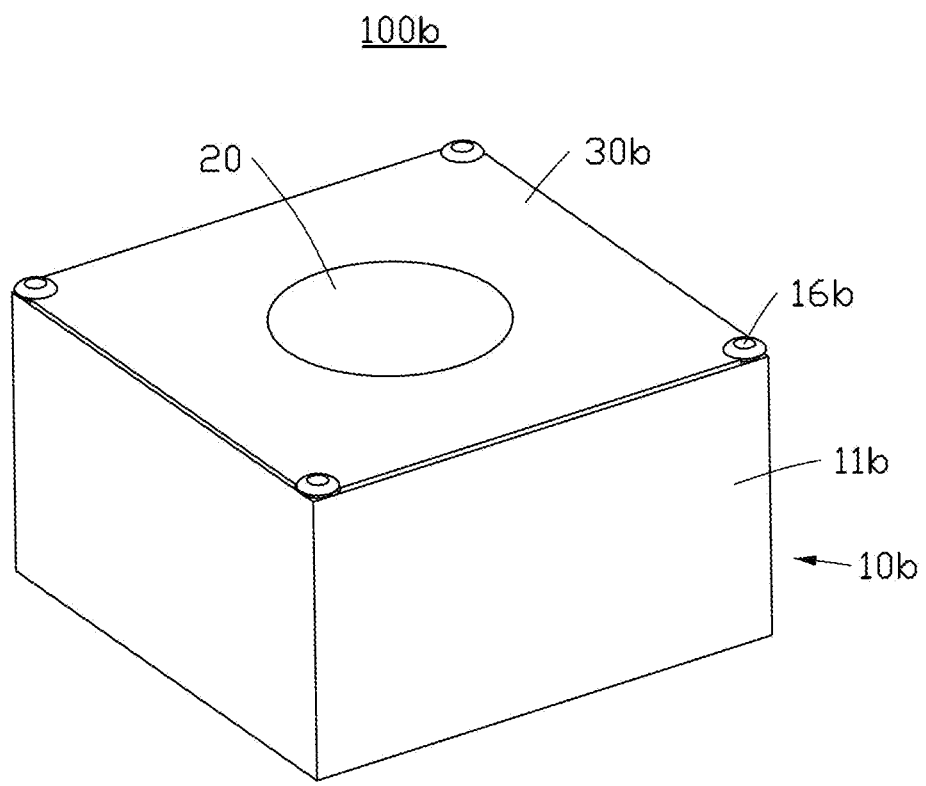
FIG. 5 is a diagrammatic view of another embodiment of a fixing assembly according to the present disclosure.
Figure 6:
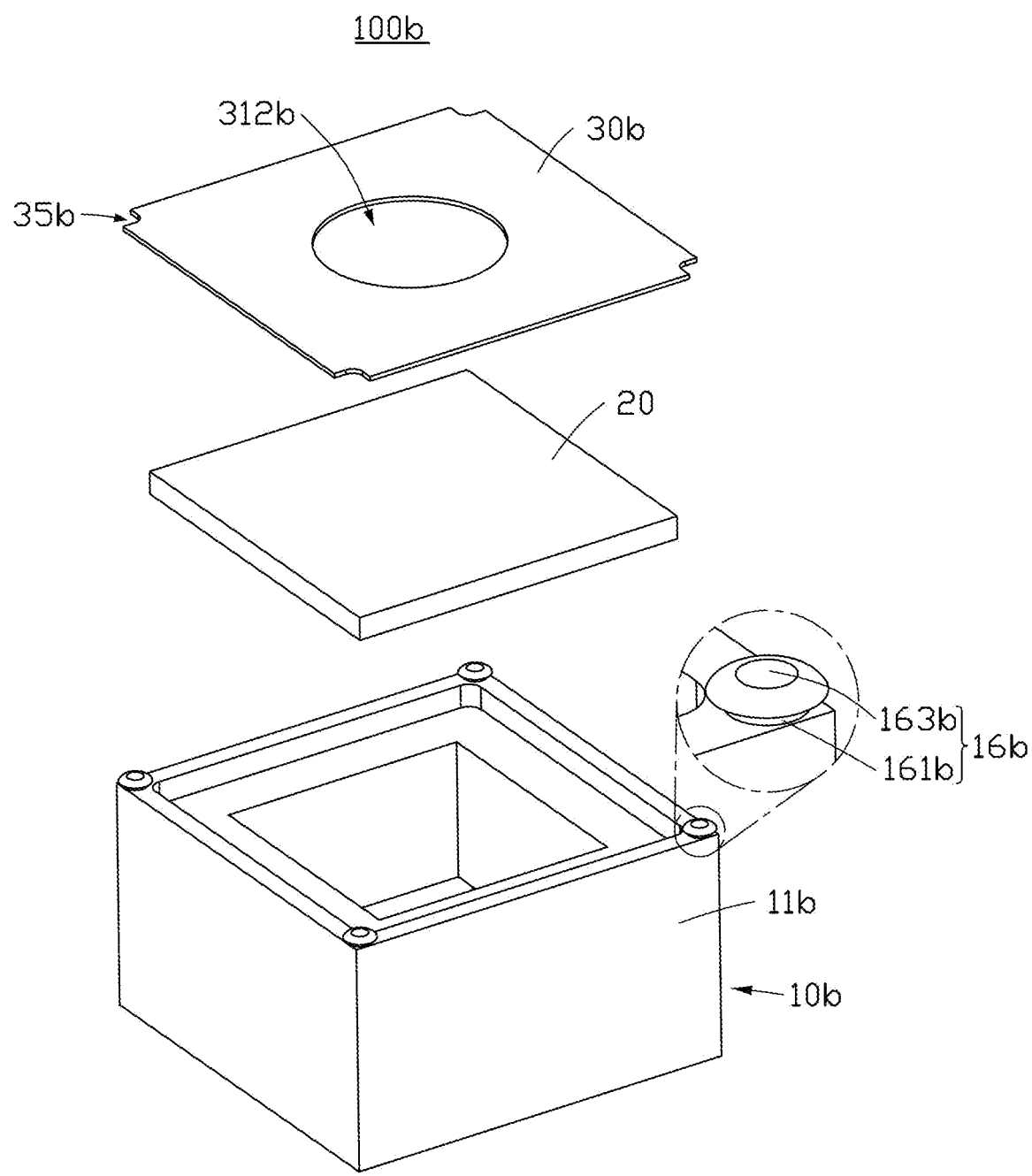
FIG. 6 is an exploded view of the fixing assembly of FIG. 5.

Referring to FIGS. 5 and 6, a fixing assembly 100b is provided according to another embodiment of the present disclosure. The fixing assembly 100b includes a lens holder 10b, a lens 20, and an aperture 30b. The aperture 30b is a flat sheet. The difference from the aperture 30 is that the aperture 30b is not provided with the second sidewalls 33. A light-passing hole 312b is defined on the aperture 30b. A plurality of concave portions 35b are defined around the aperture 30b. Each concave portions 35b is formed by concaving a corner of the aperture 30b toward a center of the aperture 30b.

The lens holder 10b includes a plurality of tenons 16b engaged with the concave portions 35b. Each tenon 16b includes a rod portion 161b and a cover portion 163b connected to each other. A diameter of the rod portion 161b is smaller than a diameter of the cover portion 163b. The rod portion 161b is connected to the first sidewall 11b, and the cover portion 163b is disposed at an end of the rod portion 161b away from the first sidewall 11b. At least a portion of the rod portion 161b is accommodated in the concave portions 35b. The aperture 30b is disposed between the cover portion 163b and the first sidewall 11b, so that the aperture 30b is fixedly connected to the lens holder 10b.

The tenon 16b can be formed by heat riveting. That is, the lens 20 is placed in the groove 15 of the lens holder 10b, the aperture 30b is placed on the surface of the lens 20. Then, a tenon 16b is formed on the surface of the first sidewall 11b by heat riveting, so that the aperture 30b, the lens 20, and the lens holder 10b are assembled as a whole.

Figure 7:
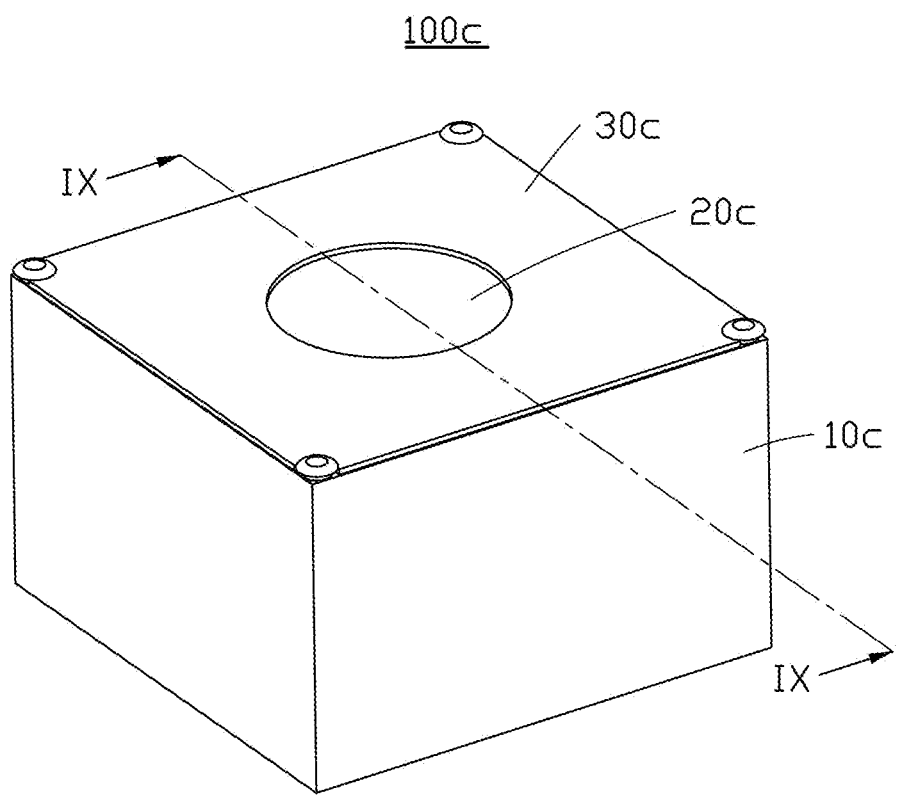
FIG. 7 is a diagrammatic view of another embodiment of a fixing assembly according to the present disclosure.
Figure 8:
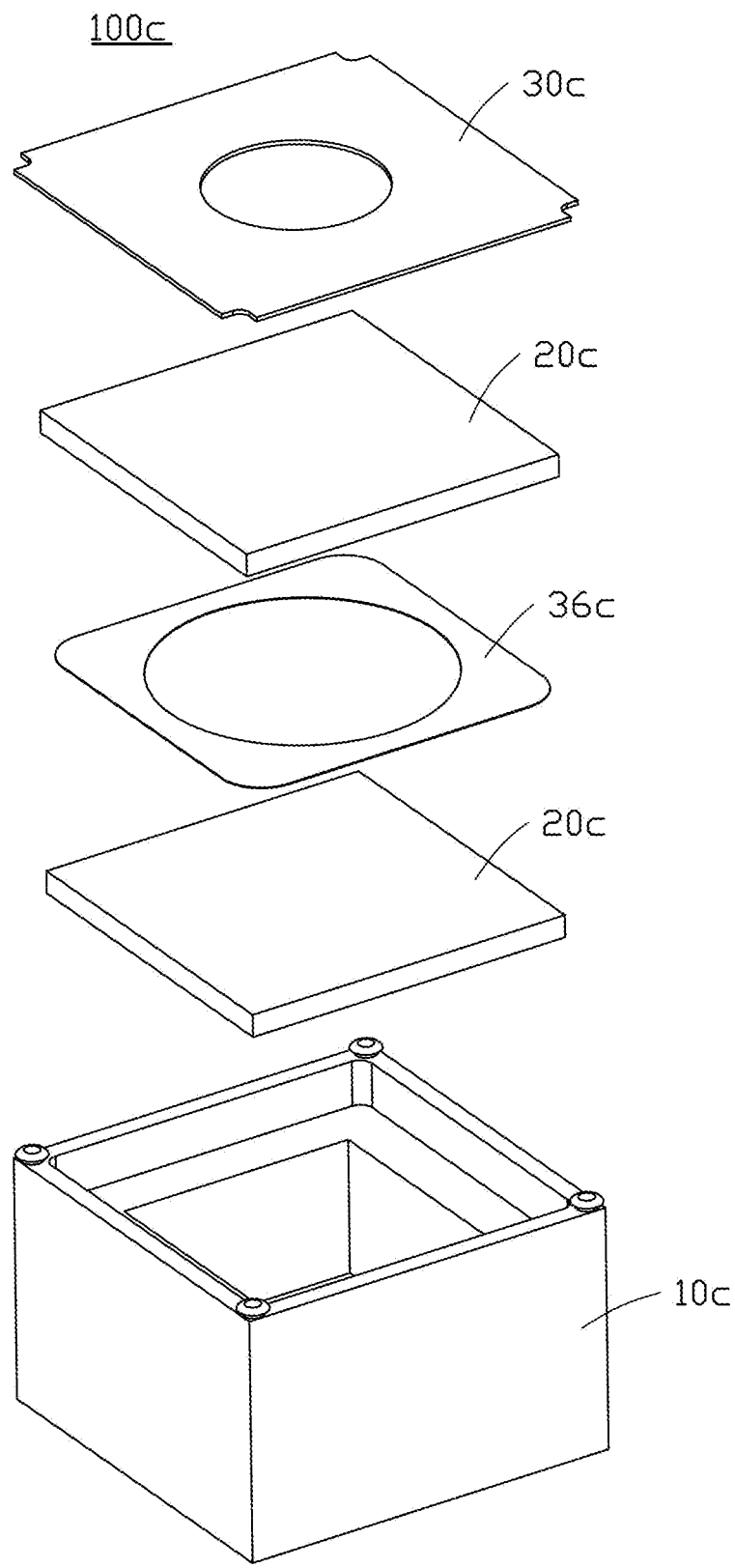
FIG. 8 is an exploded view of the fixing assembly of FIG. 7.
Figure 9:
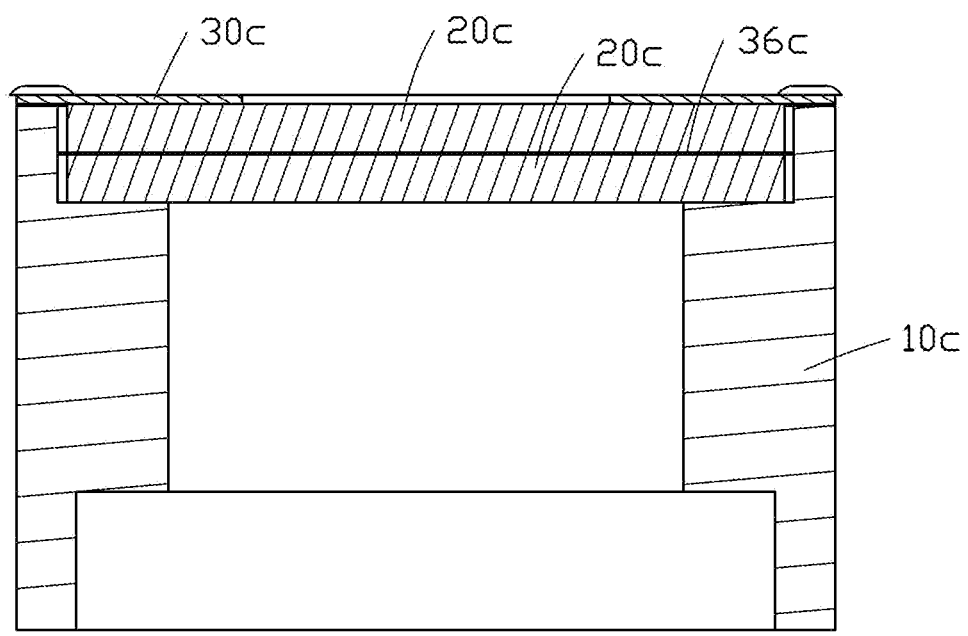
FIG. 9 is a cross-sectional view taken along line IX-IX of FIG. 7.

Referring to FIGS. 7, 8, and 9, a fixing assembly 100c is provided according to another embodiment of the present disclosure. The fixing assembly 100c includes a lens holder 10c, a plurality of lenses 20c, and an aperture 30c. The lenses 20c are stacked and disposed in the groove 15. A spacer 36c is disposed between two adjacent lenses 20c. The spacer 36c functions as a buffer to prevent unyielding contact between two adjacent lenses 20c. The spacer 36c is hollow and annular, so that the ambient light can pass through.

Figure 10:
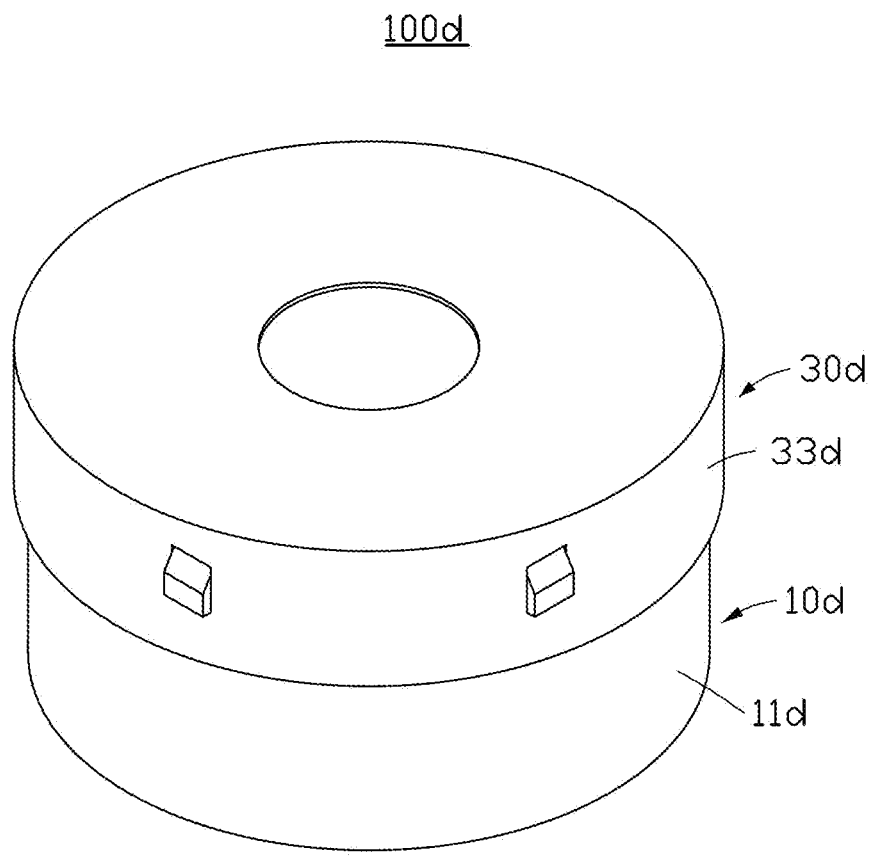
FIG. 10 is a diagrammatic view of another embodiment of a fixing assembly according to the present disclosure.

Referring to FIG. 10, a fixing assembly 100d is provided according to another embodiment of the present disclosure. In the embodiment, the lens holder 10d is cylindrical shaped with a hollow interior space, and the aperture 30d is cylindrical shaped to match the lens holder 10d. The first sidewall 11d is continuous cylindrical shaped, and the extending portion (not shown) is continuous cylindrical shaped; the second sidewall 33d is cylindrical shaped to match the first sidewall 11d.

In some embodiments, the tenon is disposed on the surface of the first sidewall away from the extending portion, the aperture covers the lens holder so as to semi-encircle it, and the concave portion is disposed on the edge area of the aperture and clamped with the tenon.

Figure 11:
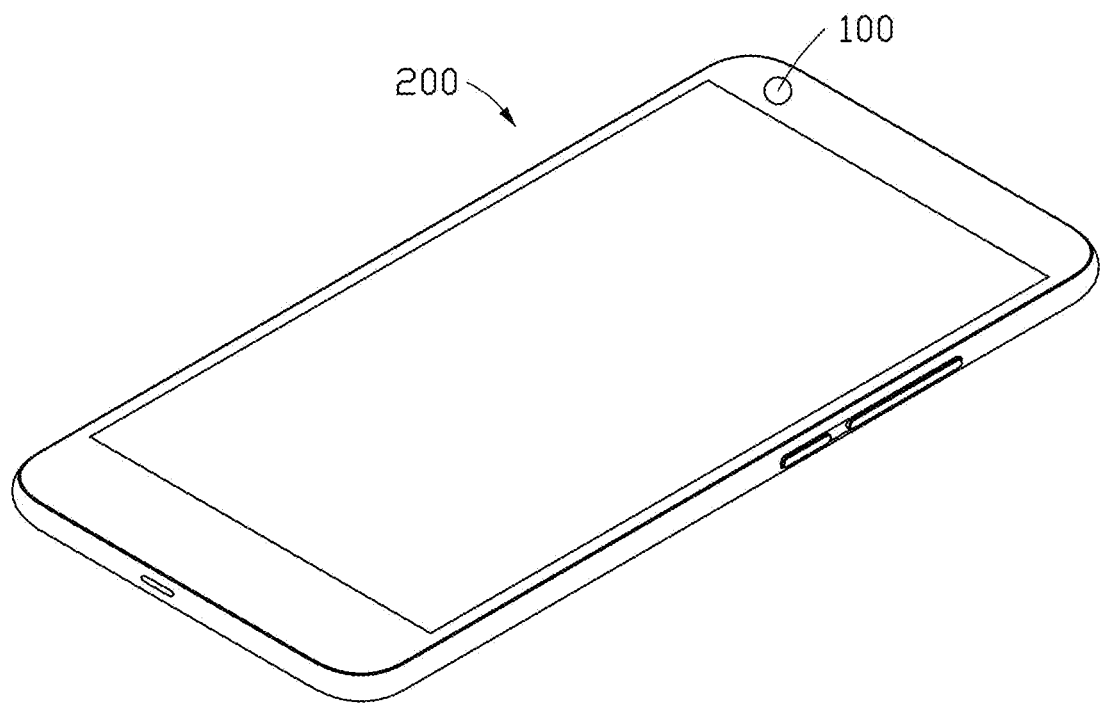
FIG. 11 is a diagrammatic view of an embodiment of an electronic device according to the present disclosure.

Referring to FIG. 11, an electronic device 200 is provided according to an embodiment of the present disclosure. The electronic device 200 is a product apply the lens module. The lens module includes the fixing assembly 100. The electronic device 200 can be a mobile phone, a wearable device, a video camera, a camera, a drone, a doorbell, a car camera, etc. In the embodiment, the electronic device 200 is a mobile phone.

The fixing assembly 100, 100a, 100b, 100c, or 100d, provided in the present disclosure fix the lens holder 10 and the aperture 30 together by snap-fit connection, and also fixes the lens 20 between the lens holder 10 and the aperture 30. The mutual fixing among the lens holder 10, the aperture 30, and the lens 20 can be achieved without the aid of other fixing means, and the assembly process is easy. Moreover, the lens 20 is accommodated in the groove 15 of the lens holder 10, which can reduce the thickness of the fixing assembly 100, 100a, 100b, 100c, or 100d.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:
1. A fixing assembly comprising:
a lens holder comprising a first sidewall and an extending portion, the first sidewall being a ring-shaped structure, the extending portion extending from an inner surface of the first sidewall, a top surface of the extending portion recessed relative to a top surface of the first sidewall to form a groove;
at least one lens received in the groove and disposed on the extending portion; and
an aperture disposed on a surface of the at least one lens away from the extending portion, and the aperture clamped with the lens holder;
wherein a plurality of concave portions is defined around the aperture, each of the plurality of concave portions is formed by concaving a corner of the aperture toward a center of the aperture; the lens holder comprises a plurality of tenons; the plurality of tenons is clamped in the plurality of concave portions; each of the plurality of tenons comprises a rod portion and a cover portion, a diameter of the rod portion is smaller than a diameter of the cover portion, at least a portion of the rod portion is accommodated in the concave portions, the aperture is disposed between the cover portion and the first sidewall.

2. The fixing assembly of claim 1, the fixing assembly further comprising a plurality of lenses and at least one spacer, wherein each of the at least one spacer is disposed between two adjacent of the plurality of lenses.

3. An electronic device comprising:
a fixing assembly comprising:
a lens holder comprising a first sidewall and an extending portion, the first sidewall being a ring-shaped structure, the extending portion extending from an inner surface of the first sidewall, a top surface of the extending portion recessed relative to a top surface of the first sidewall to form a groove;
at least one lens received in the groove and disposed on the extending portion; and
an aperture disposed on a surface of the at least one lens away from the extending portion, and the aperture clamped with the lens holder;
wherein a plurality of concave portions is defined around the aperture, each of the plurality of concave portions is formed by concaving a corner of the aperture toward a center of the aperture; the lens holder comprises a plurality of tenons; the plurality of tenons is clamped in the plurality of concave portions; each of the plurality of tenons comprises a rod portion and a cover portion, a diameter of the rod portion is smaller than a diameter of the cover portion, at least a portion of the rod portion is accommodated in the concave portions, the aperture is disposed between the cover portion and the first sidewall.

4. The electronic device of claim 3, the fixing assembly further comprising a plurality of lenses and at least one spacer, wherein each of the at least one spacer is disposed between two adjacent of the plurality of lenses.

\* \* \* \* \*